United States Patent [19]

Borst

[11] Patent Number: 4,777,331

[45] Date of Patent: Oct. 11, 1988

[54] METHOD AND ARRANGEMENT FOR TRANSMITTING BINARY-CODED INFORMATION IN A MEASURING SYSTEM

[75] Inventor: Walter Borst, Steinen, Fed. Rep. of Germany

[73] Assignee: Endress u. Hauser GmbH u. Co., Maulburg, Fed. Rep. of Germany

[21] Appl. No.: 90,748

[22] Filed: Aug. 28, 1987

[30] Foreign Application Priority Data

Sep. 26, 1986 [DE] Fed. Rep. of Germany ....... 3632840

[51] Int. Cl.[4] ......................... H04B 3/50; H04L 15/34

[52] U.S. Cl. .................................... 178/120; 178/2 R; 375/36; 375/99; 328/120

[58] Field of Search ............... 178/2 R, 118, 120, 2 E; 375/36, 26, 34, 94, 99; 328/120

[56] References Cited

U.S. PATENT DOCUMENTS 3,980,826 9/1976 Widmer ............................ 375/34 X
4,623,871 11/1986 Akano ............................. 340/310 A
4,633,217 12/1986 Akano ............................. 340/310 A
4,719,616 1/1988 Akano ................................... 370/11
4,734,919 3/1988 Tae .................................... 375/36 X

FOREIGN PATENT DOCUMENTS 3519709 6/1985 Fed. Rep. of Germany .

*Primary Examiner*—Stafford D. Schreyer
*Attorney, Agent, or Firm*—Barnes & Thornburg

[57] ABSTRACT

In a measuring system, a measuring signal is transmitted on a two-wire line by varying the DC supply current which is transmitted on the same two-wire line. In addition, binary-coded information signals are transmitted via the same two-wire line, each bit of the one binary value being represented by a group of a predetermined number of consecutive periods of a periodic signal, and each bit of the other binary value being represented by the absence of the same number of consecutive periods of the periodic signal. On reception, received periods of the periodic signals are counted in a first counting direction and missing periods are counted in the opposite counting direction between two limit counts. Reception of the one binary value is indicated when the first limit count is reached, and reception of the other binary value is indicated when the second limit count is reached.

12 Claims, 4 Drawing Sheets

Figure 1:
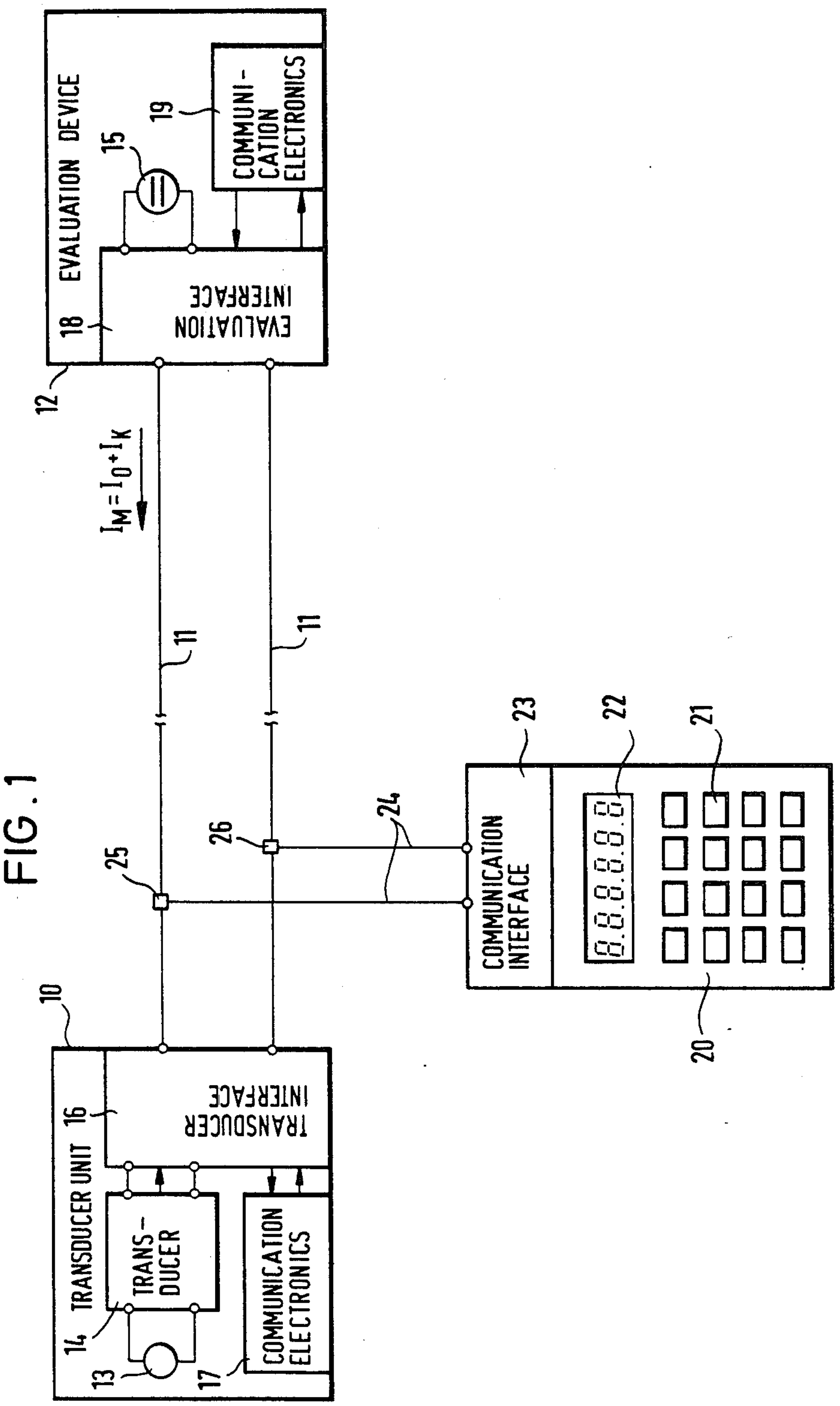

METHOD AND ARRANGEMENT FOR TRANSMITTING BINARY-CODED INFORMATION IN A MEASURING SYSTEM

The invention relates to a method for transmitting binarycoded information in a measuring system comprising a transducer unit which is connected to an evaluation device arranged remote therefrom by a two-wire line via which on the one hand the direct current energy necessary for operating the transducer unit is transmitted from the evaluation device to the transducer unit and on the other hand the measured value signal representing the measured parameter is transmitted from the transducer unit to the evaluation device in that the direct current flowing through the two-wire line is varied in dependence upon the measured parameter between two limit values, each subscriber station participating in the information transfer including a signal generator for sending a communication signal distinguishable from the measured value signal via the two-wire line and a signal receiver for receiving the communication signals coming from the other subscriber stations, and an arrangement for carrying out the method.

Numerous measuring systems are known in which the transducer unit and the evaluation device are spatially separate from each other and connected together only by a two-wire line via which on the one hand the supply direct current necessary for operating the transducer unit is transmitted from the evaluation device to the transducer unit and on the other hand the measured value signal is transmitted from the transducer unit to the evaluation device. In such measuring systems an internationally widespread standard has established itself according to which the measured value signal is a direct current signal variable between 4 and 20 mA. In such measuring systems the transducer unit influences the total current flowing via the two-wire line and containing also the supply direct current such that it represents the measured value signal.

By employing microprocessors it is possible today to make measuring systems having a substantially better performance than conventional analog devices. Progress in microelectronics (high integration densities, smaller IC housings, CMOS technology with highly integrated circuits) makes it possible to accommodate complete microcomputers in a sensor. This leads to the necessity of an additional transmission of digital information in the form of communication signals between the transducer unit and the evaluation device. However, there is also the requirement that apart from the two-wire line no additional connections are to be present between the transducer unit and the evalution device. The digital communication signals must therefore be transferred via the two-wire line in addition to the measured value signal. The transmission of the digital communication signals via the two-wire line is also to be interference-proof even under industrial conditions but must not impair the measured value signal transmitted via the two-wire line. The two-wire line may be given a considerable length (up to 1 km) but the use of a special cable should not be necessary.

The transmission of digital communication signals via the two-wire line also permits the use of communication units which are connectable as additional subscriber stations to the two-wire line and can send and receive communication signals via the two-wire line so that the communication units can likewise exchange binary information with the transducer unit, the evaluation device and possibly also with each other. This makes it possible from any station to carry out balancing, setting, checking or maintenance work.

The problem underlying the invention is the provision of a method which in a measuring system of the aforementioned type permits interference-proof transmission of binary-coded information between as many subscriber stations as desired connected to the two-wire line without the transmission of the measured value signal via the same two-wire line being impaired and which even when the two-wire line has a considerable length does not require a special cable.

Proceeding from a method of the type mentioned at the beginning this problem according to the invention is solved in that in the communication signals each bit of the one binary value is represented by a group of a predetermined number of consecutive periods of a periodic signal and each bit of the other binary value is represented by the absence of the periodic signal, and that in the signal receiver of each subscriber station for identifying the transmitted binary values the following method steps are carried out:

(a) In a counting range lying between two limit counts and smaller than the number of the periods of each group, received periods are counted in the one counting direction until the first limit count is reached and missing periods are counted in the other counting direction until the second limit count is reached;

(b) after reaching the first limit count the reception of the one binary value is indicated until the second limit count is reached;

(c) after reaching the second limit count the reception of the other binary value is indicated until the first limit count is reached.

The effect of the method according to the invention is that on the receiver side the correct binary value is recognised even when in a period group indicating the one binary value several periods, due to interferences, are missing or are not detectable and if in a time section of the missing periodic signal representing the other binary value interference signals appear which are detected as periods of the periodic signal.

Advantageous embodiments and further developments of the method and an arrangement for carrying out the method are characterized in the subsidiary claims.

Figure 2:
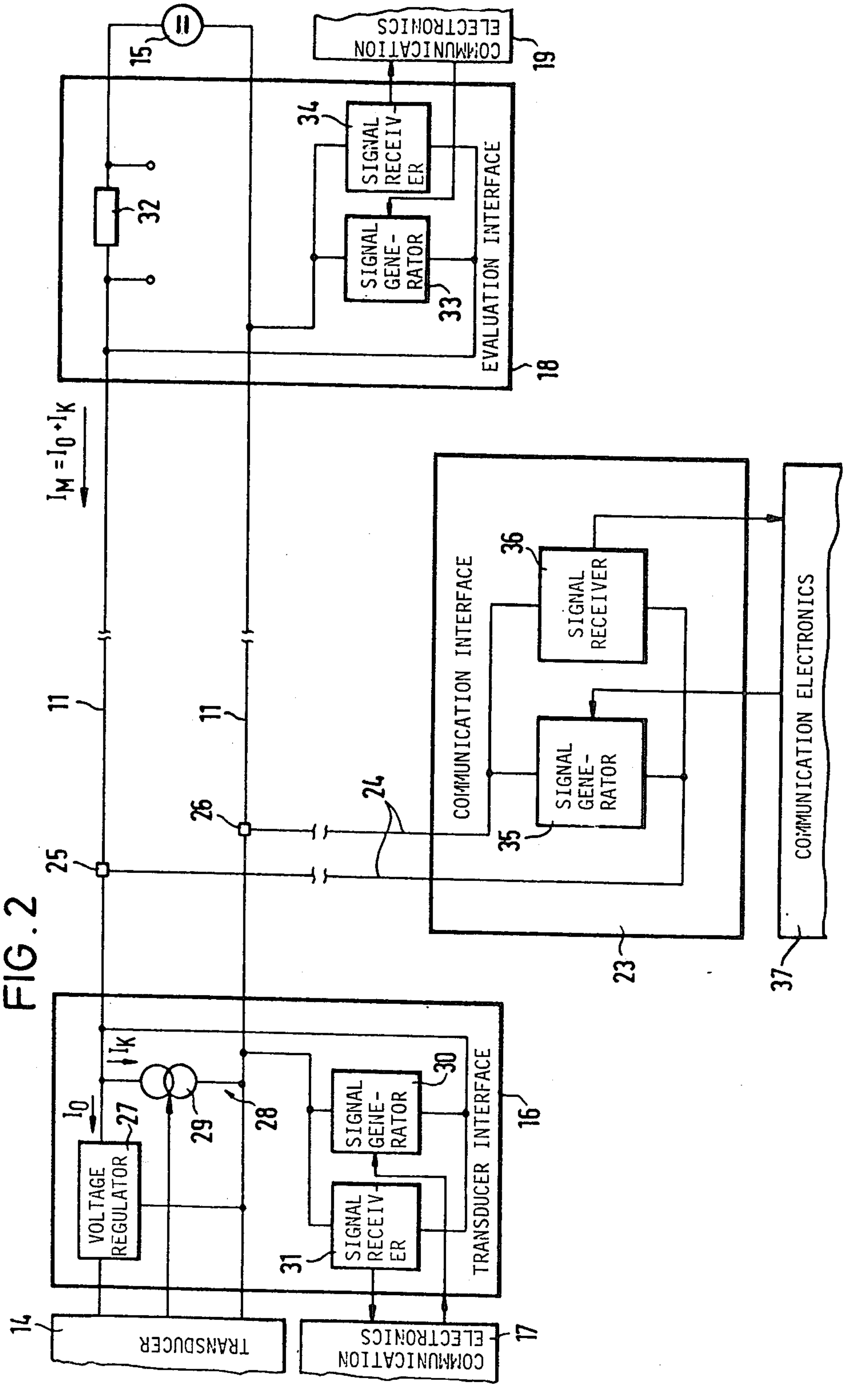
Figure 3:
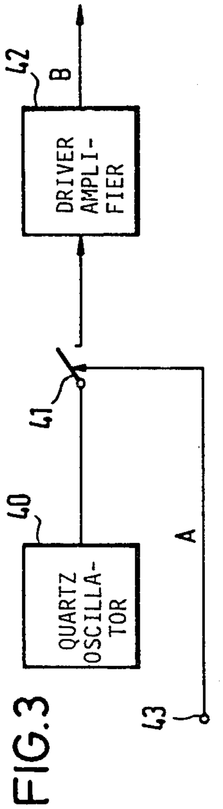
Figure 4:
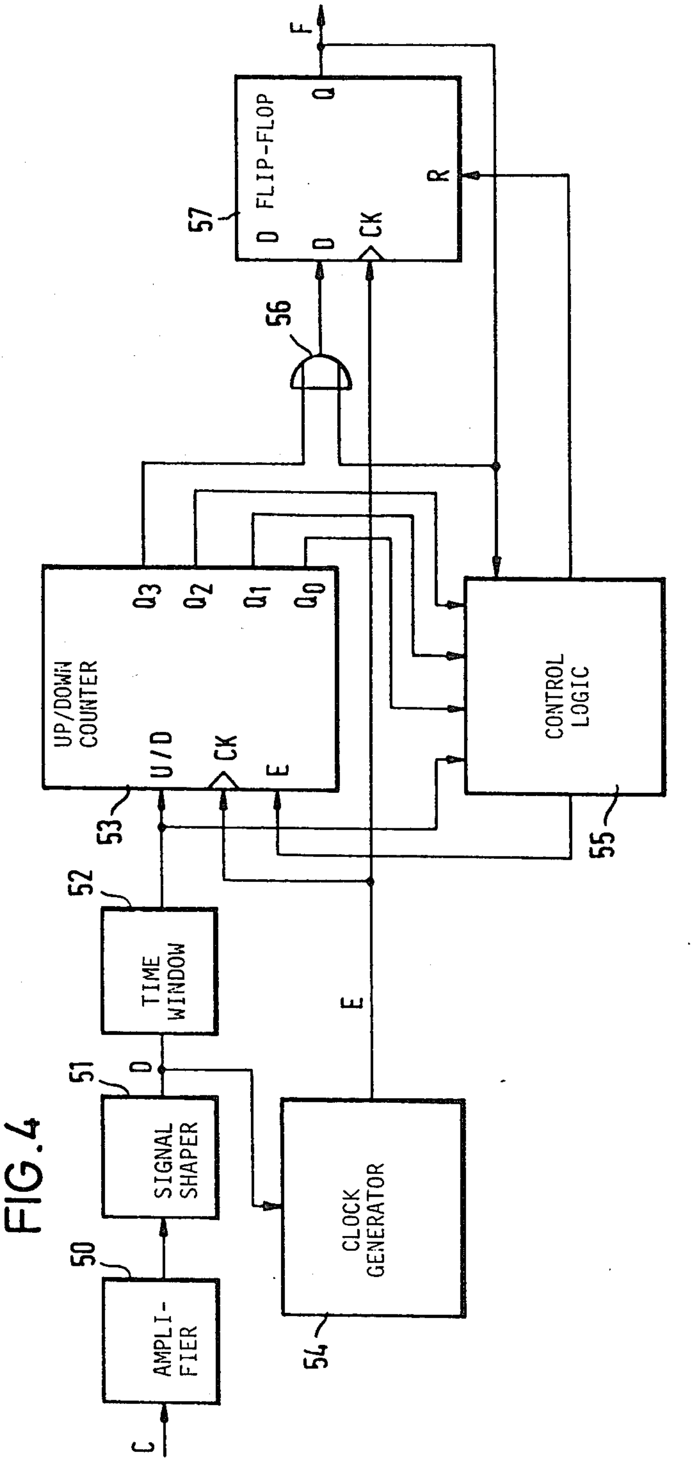
Figure 5:
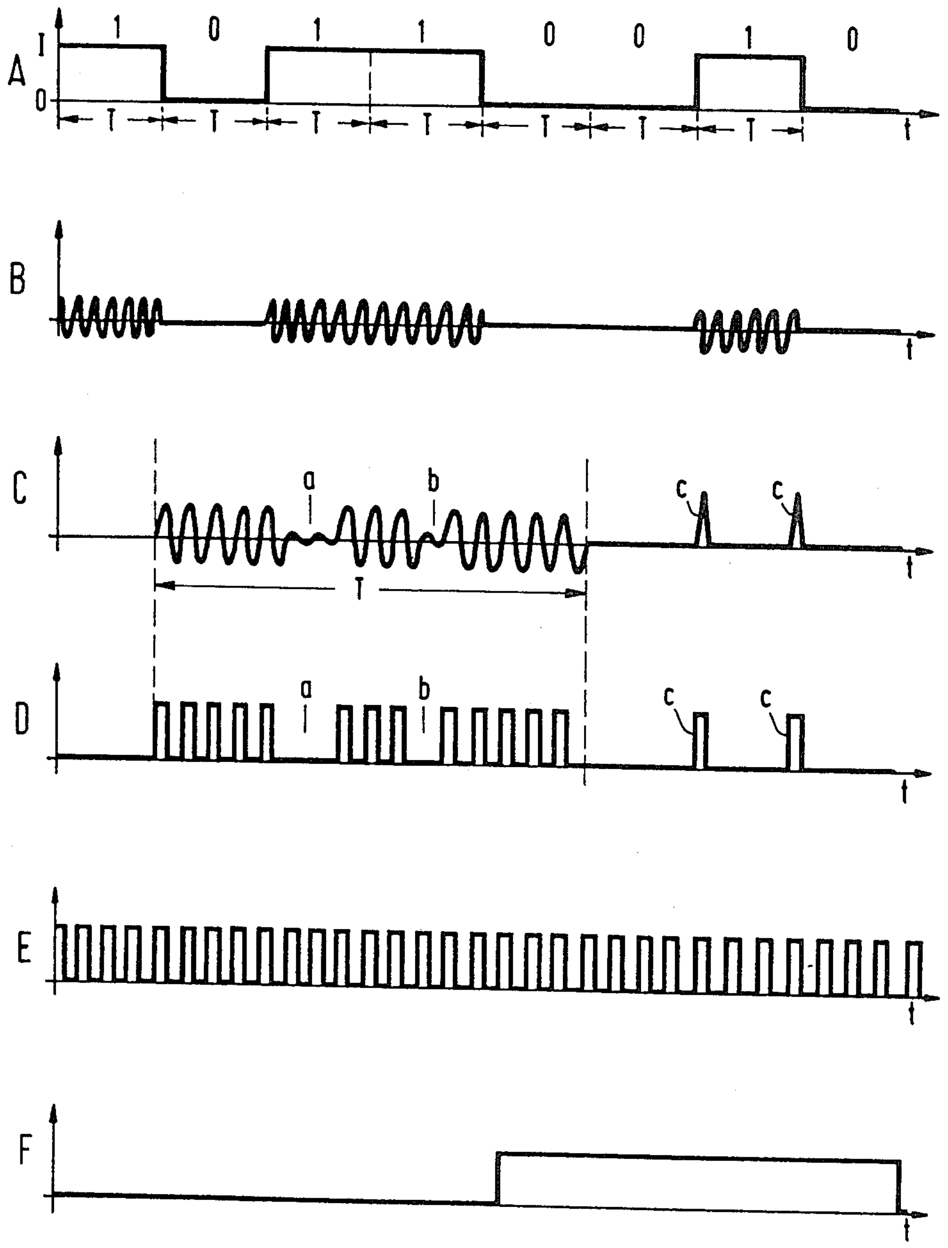

Further features and advantages of the invention will be apparent from the following description of an example of embodiment with the aid of the drawings, wherein:

FIG. 1 shows the basic diagram of a measuring system in which the invention can be employed, FIG. 2 is the circuit diagram of the three interfaces of the measuring system of FIG. 1 in greater detail, FIG. 3 is the block circuit diagram of one of the signal generators in the interfaces of FIG. 2, FIG. 4 is the block circuit diagram of one of the signal receivers in the interfaces of FIG. 2 and FIG. 5 shows the diagrams of the time profile of signals which occur at the circuit points designated with the same letters in the signal generator of FIG. 3 and the signal receiver of FIG. 4.

FIG. 1 shows a measuring system comprising a transducer unit 10 which is connected by a two-wire line 11 to an evaluation device 12 arranged remote therefrom. The transducer unit 10 includes a sensor 13 for detecting a physical parameter to be measured (e.g. temperture, pressure, humidity or moisture, filling level) and an electronic measuring transducer 14 which is connected to the sensor 13 and which furnishes a signal representing the instantaneous value of the measured parameter. The transducer unit 10 does not contain its own source of energy but obtains the direct current power necessary for its operation via the two-wire 11 from a voltage source 15 contained in the evaluation device 12. Via the same two-wire line a measured value signal representing the instantaneous value of the measured parameter is transmitted from the transducer unit 10 to the evaluation device 12. The transducer unit 10 is connected to the two-wire 11 via a transducer unit interface 16 which on the one hand ensures the energy supply of the transducer unit 10 from the 2-wireline 11 and on the other hand converts the output signal of the measuring transducer 14 to a measured value signal suitable for transmission via the two-wire line 11. In accordance with usual technology the measured value signal is the direct current $I_M$ flowing through the two-wire line 11 and made up of the supply direct current $I_O$ of the transducer unit and a correction current $I_K$. The correction current is likewise taken from the voltage source 15 and set by the transducer unit 10 to take account of the particular magnitude of the supply direct current $I_O$ so that the total current $I_M$ between the current values 4 and 20 mA represents the measured value to be transmitted. Finally, the transducer unit 10 includes communications electronics 17 which are also connected via the transducer unit interface 16 to the two-wire line 11. The measuring transducer 14 and the communications electronics 17 can be formed by a microcomputer.

To connect the evaluation device 12 to the two-wire line 11 an evaluation interface 18 is provided which on the one hand effects the transmission of the direct current energy required by the transducer unit 10 from the voltage source 15 to the two-wire line 11 and on the other from the total current $I_M$ flowing through the two-wire line 11 derives a signal suitable for indicating the measured value or for further processing. The evaluation device 12 further includes communication electronics 19 which are connected via the evaluation interface 18 to the two-wire 11. The communication electronics 19 may be formed by a microcomputer contained in the evaluation device.

FIG. 1 further shows a communication unit 20 which is connected parallel to the transducer unit 10 to the two-wire line 11 and is so made that it can perform an information exchange with the transducer unit 10 or with the evaluation device 12 without thereby impairing the normal operation of the measuring system. The communication unit 20 is a device similar to the pocket calculator comprising a keyboard 21 and a digital display 22 and the necessary communication electronics which can be formed by a microcomputer. The connection to the two-wire line 11 is via a communication interface 23 and a two-conductor lead 24 which can be clamped by means of terminals 25, 26 as required to the two-wire line 11.

In the example of embodiment described it is assumed that the communication unit 20 is equipped with its own power source (e.g. battery). It would however also be possible to obtain the direct current necessary for the power supply of the communication unit likewise from the voltage source 15 in the evaluation device 12 via the two-wire line 11.

FIG. 2 shows the circuit diagrams of the three interfaces 16, 18 and 23 of FIG. 1 in more detail.

Provided in the transducer unit interface 16 is a voltage regulator 27 which irrespective of voltage fluctuations on the two-wire line 11 maintains a constant operating voltage for the measuring transducer 14 and for the other circuits in the transducer unit 10. For generating a measuring current $I_M$ representing the measured value the transducer unit interface 16 includes a shunt branch 28 which contains a controllable constant current generator 29. Via the shunt branch 28 a continuous direct current flows which is also taken from the voltage source 15 and is superimposed on the supply direct current $I_O$ in the two-wire line 11. The constant current generator 29 is controlled by a continuously variable output signal of the measuring transducer 14 in such a manner that the direct current flowing through the shunt branch 28 forms the correction current $I_K$ which together with the supply direct current $I_O$ forms the measuring current $I_M$ variable between 4 and 20 mA.

Furthermore, the transducer unit interface 16 includes a signal generator 30 and a signal receiver 31 which are connected in parallel to the two-wire line 11. A control input of the signal generator 30 is connected to an output of the communication electronics 17. The output of the signal receiver 31 is connected to an input of the communication electronics 17.

In the evaluation interface 18 a resistor 3 2 is inserted into the one conductor of the two-wire line 11 and via said resistor 32 the measuring current $I_M = I_O + I_K$ flows. Thus, a voltage can be tapped from the resistor 32 which is proportional to the measuring current $I_M$ and contains the measured value information. This voltage can be used to display the measured value or processed in any desired manner to evaluate the measured value information. Furthermore, the evaluation interface includes a signal generator 33 and a signal receiver 34 which are connected in parallel to the two-wire line 11. A control input of the signal generator 33 is connected to an output of the communication electronics 19. The output of the signal receiver 34 is connected to an input of the communication electronics 19.

Finally, the communication interface 23 includes a signal generator 35 and a signal receiver 36 which are connected in parallel via the lead 24 to the two-wire line 11. A control input of the signal generator 35 is connected to an output of the communication electronics 37 of the communication unit. The output of the signal receiver 36 is connected to an input of the communication electronics 37.

The signal generators 30, 33 and 35 in the various interfaces are made completely identical. For this reason only one of the signal generators is described in detail and its block circuit diagram is shown in FIG. 3. This description applies to all the signal generators.

The signal generator illustrated in FIG. 3 contains a quartz oscillator 40 whose output can be connected via a switch 41 to the input of an AC voltage driver amplifier 42. The switch 41 is shown symbolically as mechanical contact. In reality it is a highspeed electronic switch, for example a field-effect transistor. The switch 41 is actuated by a binary control signal which is applied by the associated communication electronics to the control input 43 of the signal generator.

Diagram A of FIG. 5 shows the time profile of a control signal which is applied by the communication electronics to the control input 43 and which is binary coded corresponding to the message to be transmitted.

Each bit of binary value 1 is represented by a pulse of duration T of constant amplitude I and each bit of binary value 0 by a pulse interval of the same duration T in the pulse raster. The pulses or pulse intervals for two or more consecutive bits of the same binary value follow each other without gaps. The switch 41 is closed when the pulse amplitude I is applied whilst it is open in each pulse interval. The switch 41 thus effects a pulse-like keying of the oscillation generated by the oscillator 40.

Diagram B of FIG. 5 shows the time profile of the communication signal which is sent in this manner by the signal generator through the two-wire line 11. Each bit of binary value 1 is represented by an oscillation train of duration T and each bit of binary value 0 by the absence of the oscillation on the two-wire line for the same duration T.

The duration T is constant and substantially greater than the period of the oscillation of the oscillator 40. Thus, each oscillation train representing a bit of binary value 1 includes a predetermined constant number of periods. Each bit of binary value 0 is represented by the absence of the same constant number of periods.

Preferably, the frequency of the oscillation generated by the oscillator 40 is of the order of magnitude of 40 kHz. At this frequency most cables have such a high inductive component that the line is almost loss-free. At the same time such a frequency is low enough to ensure that capactive losses or losses by the skin effect are largely eliminated.

It will therefore be assumed in the example of embodiment described that the frequency of the oscillation generated by the oscillator 40 is 40 kHz. It will further be assumed that the duration of a bit $T=0.4$ ms. In each duration T there are then 16 periods of the oscillation generated by the oscillator T. The driver amplifier 42 limits the level of the oscillation trains emitted at its output to a maximum of 100 mV. In this manner the keyed communication signal is superimposed on the DC voltage applied by the voltage source 15 to the two-wire line 11. Preferably, the transmission line to each interface is terminated by an impedance substantially greater than the wave impedance. As a result the received signal voltage in spite of certain line losses at the output is at least exactly as large as at the input even with 1 km cable length.

FIG. 4 shows the block circuit diagram of one of the signal receivers 31, 34, 36 in the interfaces. All the signal receivers are constructed in the same manner.

The signal receiver includes as input stage an AC voltage amplifier 50 which selectively amplifies the communication signal transmitted via the two-wire line 11. Connected to the output of the AC voltage amplifier 50 is a signal shaper 51 which converts the sinusoidal wave trains of the communication signal to rectangular wave trains of the same recurrence frequency. The signal shaper 51 is for example a Schmitt trigger. At the output of the signal shaper 51 for each complete oscillation train of duration T there thus appears a pulse group of 16 rectangular pulses of recurrence frequency 40 kHz. These rectangular pulses are applied via a time window circuit 52 to the counting direction control input U/D (up/down) of an up/down counter 53. The time window circuit 52, which is for example formed by a non-retriggerable monoflop, responds to pulses only within a certain time raster and thus ensures additional resistance to interference.

The rectangular pulses present at the output of the signal shaper 51 are also applied to the synchronizing input of a clock generator 54 which generates a continuous rectangular pulse sequence with the recurrence frequency of the signal pulses, i.e. 40 kHz, as clock signal. The clock generator is synchronized by the rectangular pulses applied to its synchronizing input and retains this synchronization even in the time intervals in which no rectangular pulses are emitted by the signal shaper 51. The clock signal is applied to the clock input (CK) of the up/down counter 53.

Furthermore, provided for the control of the up/-down counter 53 is a control logic 55 of which one output is connected to the enable input E (enable) of the up/down counter 53. An input of the control logic 55 is connected to the output of the time window circuit 52. Three further inputs of the control logic 55 are connected to the counter stage outputs $Q_0$, $Q_l$, $Q_2$ of the up/down counter 53. The counter stage output $Q_3$ of the up/down counter 53 is connected via an OR circuit 56 to the input D of a D flip-flop 57. The output Q of the D flip-flop 57 is connected to the second input of the OR circuit 56 and to a further input of the control logic 55. The reset input R (reset) of the D flip-flop 57 is connected to a second output of the control logic 55. Finally, the clock input CK (clock) of the D flip-flop 57 receives the clock signal from the output of the clock generator 54.

The mode of operation of the signal receiver of FIG. 4 will be explained with the aid of the diagrams C to F of FIG. 5. Said diagrams show the time profile of signals which occur at the circuit points of the block circuit diagram of FIG. 4 designated by the same letters.

Diagram C of FIG. 5 shows a portion of the communication signal transmitted via the two-wire line 11 and applied to the input of the AC voltage amplifier 50, although to a larger time scale than in diagram B. An oscillation train of duration T is shown which represents the binary value 1 and which lies between two time portions which correspond to the binary value 0 and in which no oscillation trains are transmitted via the two-wire line 11. It is further assumed that due to interferences some periods of the oscillation are missing or are highly damped at the points a and b in the oscillation train. It is further assumed that in the oscillation-free time portion following the oscillation train two interference pulses c and d are present.

The diagram D shows the corresponding rectangular pulses at the output of the signal shaper 51. For each oscillation of the oscillation train whose amplitude exceeds the response threshold of the signal shaper 51 a rectangular pulse is generated. At the point a two rectangular pulses are missing and at the point b one rectangular pulse. On the other hand, in the adjoining oscillation-free time portion two rectangular pulses c and d appear generated due to interference pulses. The rectangular pulses of the diagram D are applied via the time window circuit 52 to the counting direction control input U/D of the up/down counter 53. During the application of the pulse voltage the up/down counter 53 is switched to up counting. When no pulse voltage is present the up/down counter 53 is switched to down counting. The signal shaper 51 and the time window circuit 52 thus form a counting direction control circuit.

Diagram E of FIG. 5 shows the clock signal at the output of the clock generator 54. Said clock signal is a continuous sequence of rectangular pulses which due to the synchronization coincide in time with the rectangular pulses of diagram D if the latter are present. Since said clock signal is applied to the clock input CK of the up/down counter 53 the clock pulses in said counter are counted as follows:

All the clock pulses which coincide in time with signal pulses of diagram D are counted in the up direction in the up/down counter 53 provided that the counting is allowed by the control signal applied by the control logic 55 to the enable input E;

all the clock pulses for which no signal pulses are present in the diagram D are counted in the down direction in the up/down counter 53 provided that the counting is allowed by the control signal applied by the control logic 55 to the enable input E.

This mode of operation is equivalent to saying that signal pulses present in the up/down counter 53 are counted up and missing signal pulses are counted down.

In accordance with the known mode of operation of a D flip-flop the D flip-flop 57 assumes for each clock pulse applied to the clock input CK the state defined by the signal value present at the input D. At the start of the counting the D flip-flop is in the state 0 and remains in this state for as long as the output $Q_3$ of the up/down counter 53 carries the signal value 0. In this state the output signal at the output Q of the D flip-flop 57 also has the state 0. When however in the up counting the count 8 is reached the output signal at the output $Q_3$ changes to the signal value 1. The D flip-flop is thereby brought to the state 1 and the signal value 1 appears at the output Q of the D flip-flop. Said signal value 1 is applied via the OR circuit 56 to the input D so that the D flip-flop for all the following clock pulses itself retains the state 1 even when the output $Q_3$ again returns to the signal value 0. The D flip-flop 57 is reset to the state 0 again only by a reset pulse applied by the control logic 55 to the reset input R. The D flip-flop 57 thus forms in this case a hold circuit; it could also be replaced by another hold circuit of a type known per se.

The control logic 55 controls the operation of the up/down counter 53 in the following manner by the control signal applied to the enable input E:

In the count range between the counts 0 and 8 the control logic enables the up counting of signal pulses present and the down counting of missing signal pulses irrespective of the signal value at the output Q of the D flip-flop 57.

When during up counting the count 8 is reached the control logic 55 inhibits further up counting of signal pulses present but permits a down counting of missing signal pulses. For this purpose it receives the pulses from the output of the time window circuit 52 and for each of said pulses applies an inhibit signal to the enable input E whereas otherwise an enable signal is present.

When during down counting the count 0 is reached the control logic 55 sends to the reset input R of the D flip-flop 57 a reset pulse which resets the D flip-flop 57 to the state 0. The output Q then assumes the signal value 0. Furthermore, the control logic 55 inhibits further down counting of missing signal pulses but allows up counting of signal pulses present. For this purpose it applies an enable signal to the enable input E whenever a pulse is present at the output of the time window circuit 52 whilst otherwise an inhibit signal is applied The control logic 55 detects the reaching of the counts 8 and 0 in the one and other counting direction respectively on the basis of the signals it receives from the counter stage outputs $Q_0$, $Q_1$ and $Q_2$ of the up/down counter 53.

The signal at the output Q of the D flip-flop 57 represents the output signal of the signal receiver. The mode of operation of the signal receiver outlined has the following effect on formation of the output signal:

The output signal goes from the signal value 0 to the signal value 1 if since the last transition to the signal value 0 eight more signal pulses present have been counted than missing pulses;

the output signal goes from the signal value 1 to the signal value 0 if since the last transition to the signal value 1 eight more missing signal pulses have been counted than pulses present.

In both cases the missing or present signal pulses not counted during the retention of the counts 0 and 8 are disregarded.

Diagram F of FIG. 5 shows the output signal of the signal receiver obtained with this mode of operation for the input signal represented in diagram C if it is assumed that the up/down counter 53 at the start of the oscillation train, i.e. at the start of the signal pulse group of diagram D, had the count 0. Firstly five clock pulses of the diagram E are counted up and then the two clock pulses in the gap a are counted down. The next three clock pulses are again counted up and then one clock pulse in the gap b is counted down. Finally, after up counting of three further clock pulses the count 8 is reached. At this instant the output signal (diagram F) goes to the signal value 1. For the two remaining signal pulses no further counting of clock pulses is then effected.

The down counting starts with the first missing signal pulse. Firstly, four clock pulses are counted in the down direction and then for the interference pulse c one clock pulse is counted in the up direction. The next two clock pulses are again counted down and then one clock pulse is counted up for the interference pulse d. Finally, after hhe down counting of four further clock pulses the count 0 is reached. At this instant the output signal changes to the signal value 0. For the following missing signal pulses there is then no further counting of clock pulses until a pulse again appears at the output of the time window circuit.

With this mode of operation the transmitted binary values are correctly recognised with great freedom from error but with a slight delay. This makes possible interferenceproof transmission of digital information on a two-wire line through which a measuring current is flowing under industrial use conditions without the analog measuring signal being inadmissibly disturbed. The transmission line may have a considerable length without a special cable being necessary. A further advantage of the transmission type described resides in that bus collisions are not possible, i.e. two or more subscribers can simultaneously transmit and be detected so that it is possible in an alarm situation to interrupt any data communication traffic which may be running to transport more important information via the two-wire line.

The transducer unit 10 and the evaluation device 12 form two subscriber stations which are permanently connected to the two-wire line 11 and which by means of the communication devices described can exchange information via the two-wire line carrying the measured value signal. For example, the evaluation device can send to the transducer unit control commands for controlling the operation of the transducer unit and the transducer unit can confirm the control commands and transfer requested additional information to the evaluation device. By connecting the communication unit 20 to the two-wire line an operator can monitor the information exchanged between the transducer unit and evaluation device and himself exchange information with these two subscriber stations. This makes it possible for example to carry out at any desired point balance, setting or checking operations without the normal operation of the measuring system thereby being impaired. The number of subscriber stations which can communicate with each other in this manner is not limited. It is readily possible to connect a plurality of communication units in the manner of the communication unit 20 simultaneously to the two-wire line 11. All the communication units can then exchange information with the transducer unit 10, the evaluation device 12 and with every other communication unit. In accordance with a technique known per se by suitable coded address signals it can be ensured that each subscriber station only evaluates the information intended for it.

Of course, numerous modifications of the method and the arrangement described for carrying out the method are possible. In particular, the numerical values given are to be regarded only as examples which can be modified if necessary. Thus, it is not essential to make the counting range between the two limit counts equal to half the period per bit length. It would also be possible to generate in the signal generator itself for each bit of binary value 1 instead of a sinusoidal wave train a pulse group and to transmit this as communication signal via the two-wire line.

I claim:

1. Method for transmitting binary-coded information in a measuring system comprising a transducer unit which is connected to an evaluation device arranged remote therefrom by a two-wire line via which on the one hand the direct current energy necessary for operating the transducer unit is transmitted from the evaluation device to the transducer unit and on the other hand the measured value signal representing the measured parameter is transmitted from the transducer unit to the evaluation device in that the direct current flowing through the two-wire line is varied in dependence upon the measured parameter between two limit values, each subscriber station participating in the information transfer including a signal generator for sending a communication signal distinguishable from the measured value signal via the two-wire line and a signal receiver for receiving the communication signals coming from the other subscriber stations, characterized in that in the communication signals each bit of the one binary value is represented by a group of a predetermined number of consecutive periods of a periodic signal and each bit of the other binary value is represented by the absence of the periodic signal, and that in the signal receiver of each subscriber station for identifying the transmitted binary values the following method steps are carried out:

(a) in a counting range lying between two limit counts and smaller than the number of the periods of each group, received periods are counted in the one counting direction until the first limit count is reached and missing periods are counted in the other counting direction until the second limit count is reached;

(b) after reaching the first limit count the reception of the one binary value is indicated until the second limit count is reached;

(c) after reaching the second limit count the reception of the other binary value is indicated until the first limit count is reached.

2. Method according to claim 1 in which the counting range is equal to half the number of the periods in each group.

3. Method according to claim 1 in which the communication signal is formed by keyed oscillation trains of a sinusoidal wave.

4. Arrangement for carrying out the method according to claim 1 in which each signal receiver includes an up/down counter to the counting input of which clock pulses are applied which are generated by a clock generator synchronized by the received communication signal, and a control logic which in the counting range between the limit counts effects the counting of the clock pulses in the one counting direction on reception of the periodic signal and in the other counting direction when the periodic signal is not received and prevents a counting of clock pulses beyond the limit counts.

5. Arrangement according to claim 4 in which a counting direction control circuit applies to the counting direction control input of the up/down counter for each period of the reception of the periodic signal a control signal defining the one counting direction and for each period when the periodic signal is not received a control signal defining the other counting direction and that the control logic applies to the enable input of the up/down counter on reception of the periodic signal an enable signal and when the periodic signal is not received an inhibit signal if the up/down counter is in the one limit count, and on reception of the periodic signal an inhibit signal and when the periodic signal is not received an enable signal if the up/down counter is in the other limit count.

6. Arrangement according to claim 5 in which at least the counter stage outputs of the up/down counter designating the limit counts are connected to inputs of the control logic.

7. Arrangement according to claim 5 in which the counting direction control circuit includes a signal shaper which for each period of reception of the periodic signal generates a rectangular pulse.

8. Arrangement according to claim 7 in which between the output of the signal shaper and the counting direction control input of the up/down counter a time window circuit is inserted which permits the transmission of the rectangular pulses generated by the signal shaper only in a predetermined time raster.

9. Arrangement according to claim 4 in which the up/down counter is followed by a hold circuit which is controlled by the counter stage outputs designating the limit counts in such a manner that on reaching the one limit count it is brought into the one state and on reaching the other limit count it is brought into the other state whilst at the other counts it retains the particular last state set and that the output of the hold circuit forms the output of the signal receiver.

10. Arrangement according to claim 9 in which the hold circuit is formed by a D flip-flop which receives at the clock input the clock pulses and the D input of which receives a signal denoting reaching of the one limit count and which is made self-holding by a connection from the direct output to the D input, and that to the reset input of the D flip-flop a reset pulse is applied by the control logic when the latter detects that the other limit count is reached.

11. Arrangement according to claim 4 in which the signal generator includes an oscillator which generates the periodic signal and the output signal of which is keyed by a switch which is actuated by a binary control signal representing the binary-coded information.

12. Arrangement according to claim 11 in which the periodic signal keyed by the switch is applied to the two-wire line via a driver amplifier which is limits the signal level to a predetermined value.

* * * * *